US011533179B2

(12) United States Patent
Fagan et al.

(10) Patent No.: US 11,533,179 B2
(45) Date of Patent: Dec. 20, 2022

(54) TURN AUTHENTICATION USING SIP CHANNEL DISCOVERY (71) Applicant: Cisco Technology, Inc., San Jose, CA (US)

(72) Inventors: Ollie Fagan, Galway (IE); John Costello, Galway (IE); Owen Friel, Penang (MY); Andrew West, High Wycombe (GB)

(73) Assignee: Cisco Technology, Inc., San Jose, CA (US)

( * ) Notice: Subject to any disclaimer, the term of this patent is extended or adjusted under 35 U.S.C. 154(b) by 190 days.

(21) Appl. No.: 16/992,349

(22) Filed: Aug. 13, 2020

(65) Prior Publication Data
US 2022/0052850 A1   Feb. 17, 2022

(51) Int. Cl.
*H04L 9/32* (2006.01)
*H04L 65/1073* (2022.01)
*H04L 9/14* (2006.01)
*H04L 61/2589* (2022.01)
*H04L 9/40* (2022.01)
*H04L 61/4541* (2022.01)
(Continued)

(52) U.S. Cl.
CPC ............ *H04L 9/3226* (2013.01); *H04L 9/14* (2013.01); *H04L 9/3242* (2013.01); *H04L 61/2589* (2013.01); *H04L 61/4541* (2022.05); *H04L 61/5007* (2022.05); *H04L 63/083* (2013.01); *H04L 65/1073* (2013.01); *H04L 65/1104* (2022.05)

(58) Field of Classification Search
CPC ....... H04L 9/3226; H04L 9/14; H04L 9/3242; H04L 61/1541; H04L 61/2007; H04L 61/2589; H04L 63/083; H04L 65/1006; H04L 65/1073
See application file for complete search history.

(56) References Cited

U.S. PATENT DOCUMENTS

2009/0094684 A1* 4/2009 Chinnusamy ....... H04L 63/0281
726/4
2014/0123267 A1   5/2014 Preiss et al.
(Continued)

OTHER PUBLICATIONS

Nick Galea, "The STUN Protocol and VoIP—Part 2", Mar. 23, 2016 (Year: 2016).*
(Continued)

*Primary Examiner* — Henry Tsang
(74) *Attorney, Agent, or Firm* — Behmke Innovation Group LLC; Kenneth J. Heywood; Jonathon P. Western (57) ABSTRACT In one embodiment, an endpoint in a network sends a Session Initiation Protocol (SIP) registration request to a device. The device generates a first key using information included in the SIP registration request. The device also writes the first key to a storage location accessible by a Traversal Using Relays around Network address translators (TURN) server. The endpoint generates a second key based on the information included in the SIP registration request. The endpoint sends an allocate request to the TURN server that includes the second key. The TURN server authenticates the endpoint based in part by comparing the second key to the first key. The endpoint receives an allocate response from the TURN server, after the TURN server authenticates the endpoint.

19 Claims, 7 Drawing Sheets (51) Int. Cl.
*H04L 61/5007* (2022.01)
*H04L 65/1104* (2022.01)

(56) References Cited

U.S. PATENT DOCUMENTS

| | | | |
|---|---|---|---|
| 2014/0150075 A1 | 5/2014 | Ryner | |
| 2014/0222963 A1 | 8/2014 | Gangadharan et al. | |
| 2014/0241341 A1* | 8/2014 | Terpstra | H04L 65/1006 370/352 |
| 2014/0334481 A1 | 11/2014 | Boire-Lavigne et al. | |
| 2015/0188882 A1* | 7/2015 | Wang | H04L 61/1529 370/352 |
| 2016/0156623 A1* | 6/2016 | Liang | H04W 12/06 713/168 |
| 2016/0173464 A1* | 6/2016 | Wang | H04L 65/103 713/171 |
| 2017/0187678 A1* | 6/2017 | Wang | H04L 65/1033 |

OTHER PUBLICATIONS

"Network Address Translation", online: https://en.wikipedia.org/wiki/Network_address_translation, Jul. 9, 2020, 9 pages, Wikimedia Foundation, Inc.

Rosenberg, et al., "Sesssion Traversal Utilities for NAT (STUN)", Network Working Group, Request for Comments 5389, Oct. 2008, 51 pages, the IETF Trust.

Mahy, et al., "Traversal Using Relays around NAT (TURN): Relay Extensions to Session Traversal Utilities for NAT (STUN)", Internet Engineering Task Force, Request for Comments 5766, Apr. 2010, 67 pages, the IETF Trust.

"Session Border Controller", online: https://en.wikipedia.org/wiki/Session_border_controller, Dec. 24, 2019, 4 pages, Wikimedia Foundation, Inc.

"Session Initiation Protocol", online: https://en.wikipedia.org/wiki/Session_Initiation_Protocol, Jun. 24, 2020, 9 pages, Wikimedia Foundation, Inc.

"Traversal Using Relays around NAT", online: https://en.wikipedia.org/wiki/Traversal_Using_Relays_around_NAT, Jun. 21, 2020, 2 pages, Wikimedia Foundation, Inc.

"2.2. What is a Session Border Controller (SBC)?", online: https://www.frafos.com/upload/html/2_What_is_a_Session_BorderController_.html, Handbook 4.0 documentation, Jul. 22, 2020, 4 pages, FRAFOS ABC SBC.

"NAT Traversal with Session Border Controllers", online: https://en.wikipedia.org/wiki/NAT_traversal_with_session_border_controllers, Oct. 31, 2019, 3 pages, Wikimedia Foundation, Inc.

Rosenberg, Jonathan "SIP and NAT", Dec. 14, 2013, 20 pages, Cisco Systems, Inc.

* cited by examiner

TURN AUTHENTICATION USING SIP CHANNEL DISCOVERY

TECHNICAL FIELD

The present disclosure relates generally to computer networks, and, more particularly, to Traversal Using Relays around Network address translators (TURN) using Session Initiation Protocol (SIP) channel discovery.

BACKGROUND

Network Address Translators (NATs) are devices that map an Internet Protocol (IP) address in one address space to a different IP address space by rewriting the IP headers of traffic packets. This is often done, for instance, between the public Internet and a private network, so that devices within the private network can use their own address space, while leveraging a single, externally-facing address. However, the use of NAT can be problematic for certain types of traffic, such as peer-to-peer (P2P), Voice over IP (VoIP), video, messaging, and other forms of media traffic.

Session Traversal Utilities for NAT (STUN) was created to allow certain traffic to traverse a NAT. In general, STUN operates by allowing a device to identify an IP address and port of a peer with which it is to communicate. STUN itself, though, does not provide a complete solution that allows any peer to communicate with another peer across the public Internet (e.g., when a symmetric NAT is used, etc.). One way around this is to relay the traffic through a relay server on the public Internet. For this reason, Traversal Using Relays around NAT (TURN) was introduced, which allows a client to obtain the IP address and ports from the relay.

Today, TURN is widely deployed for NAT traversal from an enterprise to the public Internet, as it allows a pinhole for media over a specific port, such as port 3478. Given that TURN servers are publicly available on the Internet, they must be authenticated for use, to avoid resource misuse. Typically, authentication is achieved using a set of static credentials that the device learns during onboarding. This means that all devices globally are using the same set of credentials, which brings with it risks in terms of shared credential leaking. In addition, this is also typically performed using a digest, requiring two round trips for each allocate operation. While it may be possible to use individual credentials per device, doing so also requires TURN server integration with the backend authentication service to lookup the username.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an endpoint in a network sends a Session Initiation Protocol (SIP) registration request to a device. The device generates a first key using information included in the SIP registration request. The device also writes the first key to a storage location accessible by a Traversal Using Relays around Network address translators (TURN) server. The endpoint generates a second key based on the information included in the SIP registration request. The endpoint sends an allocate request to the TURN server that includes the second key. The TURN server authenticates the endpoint based in part by comparing the second key to the first key. The endpoint receives an allocate response from the TURN server, after the TURN server authenticates the endpoint.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
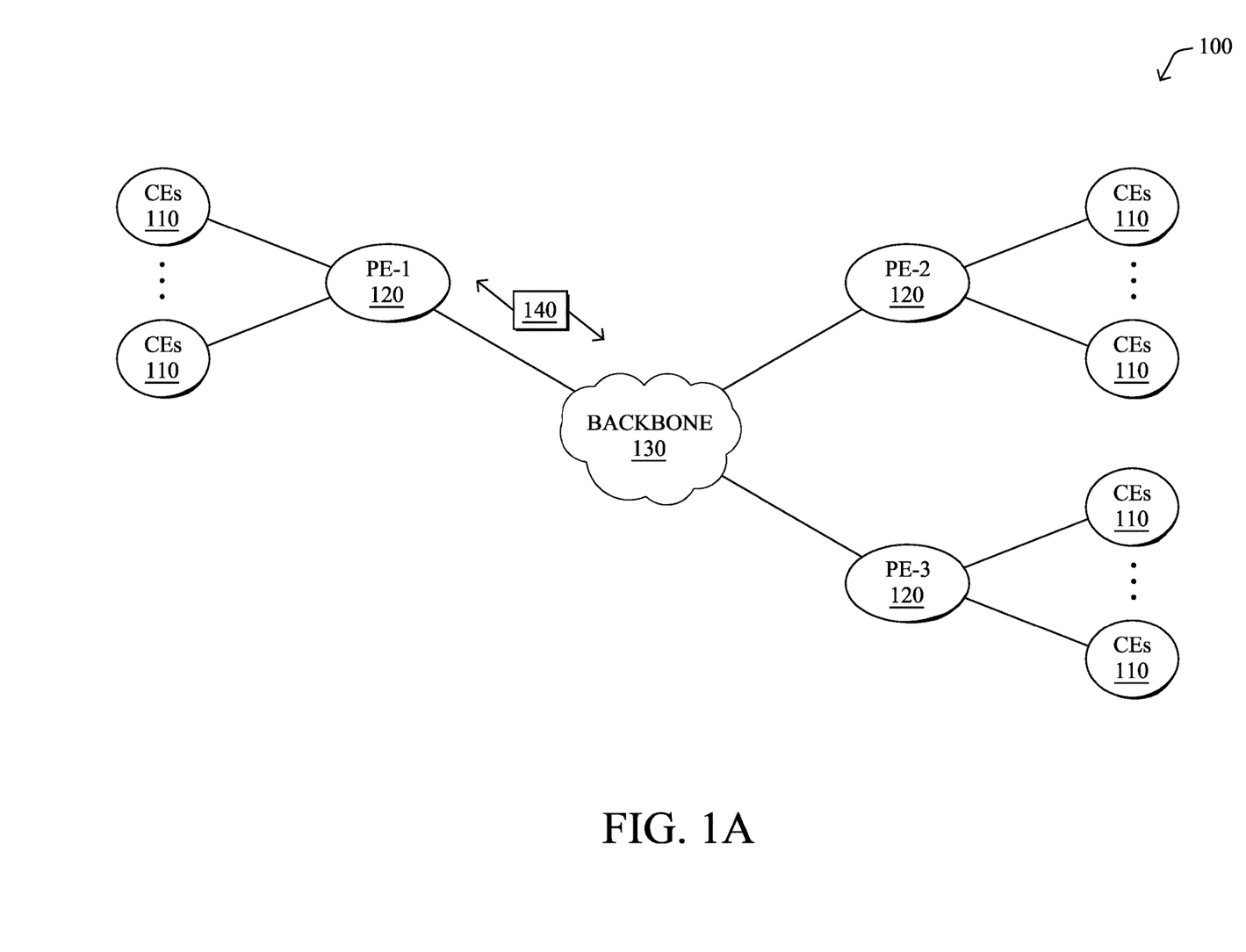
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B 1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
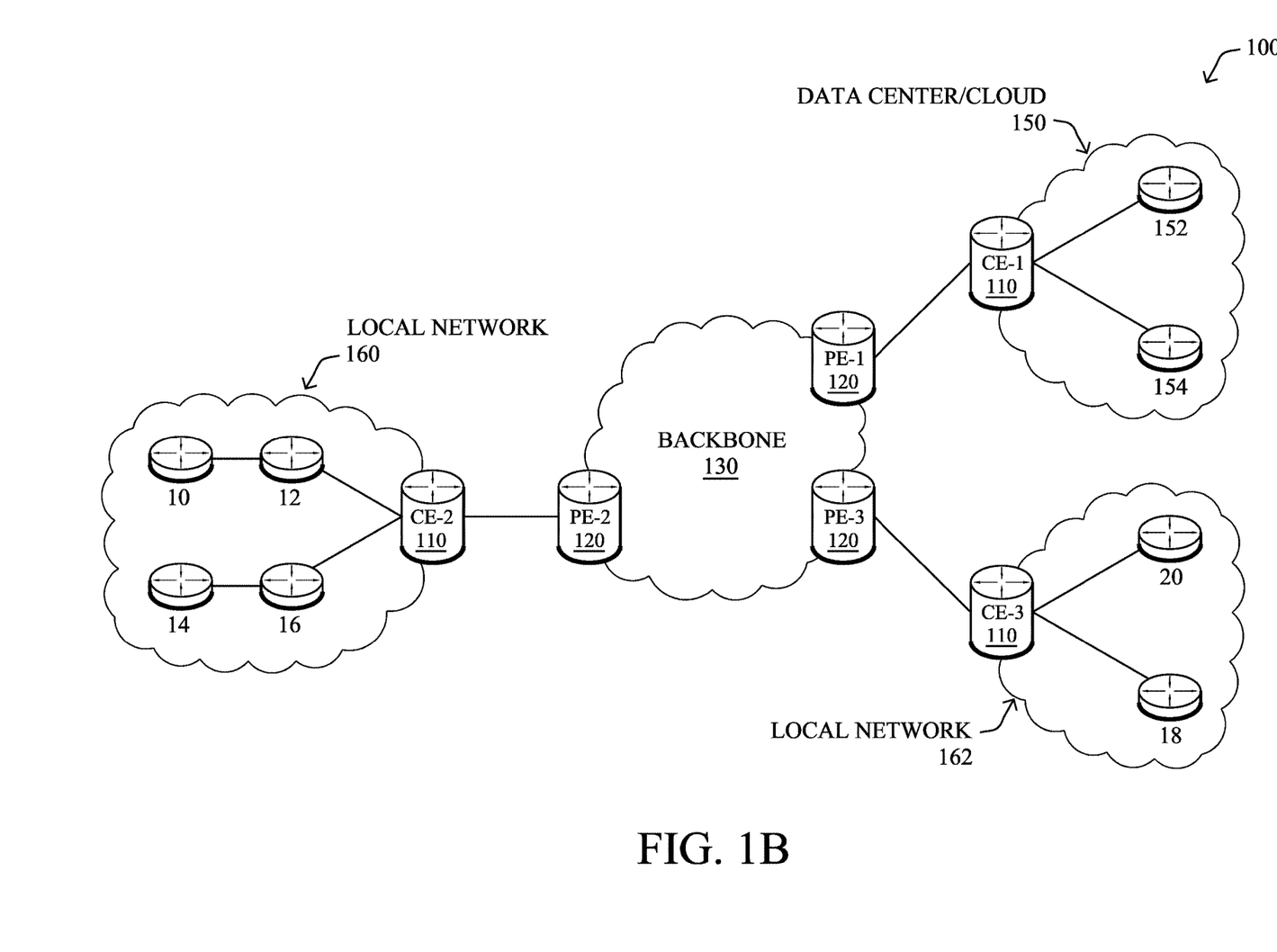

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
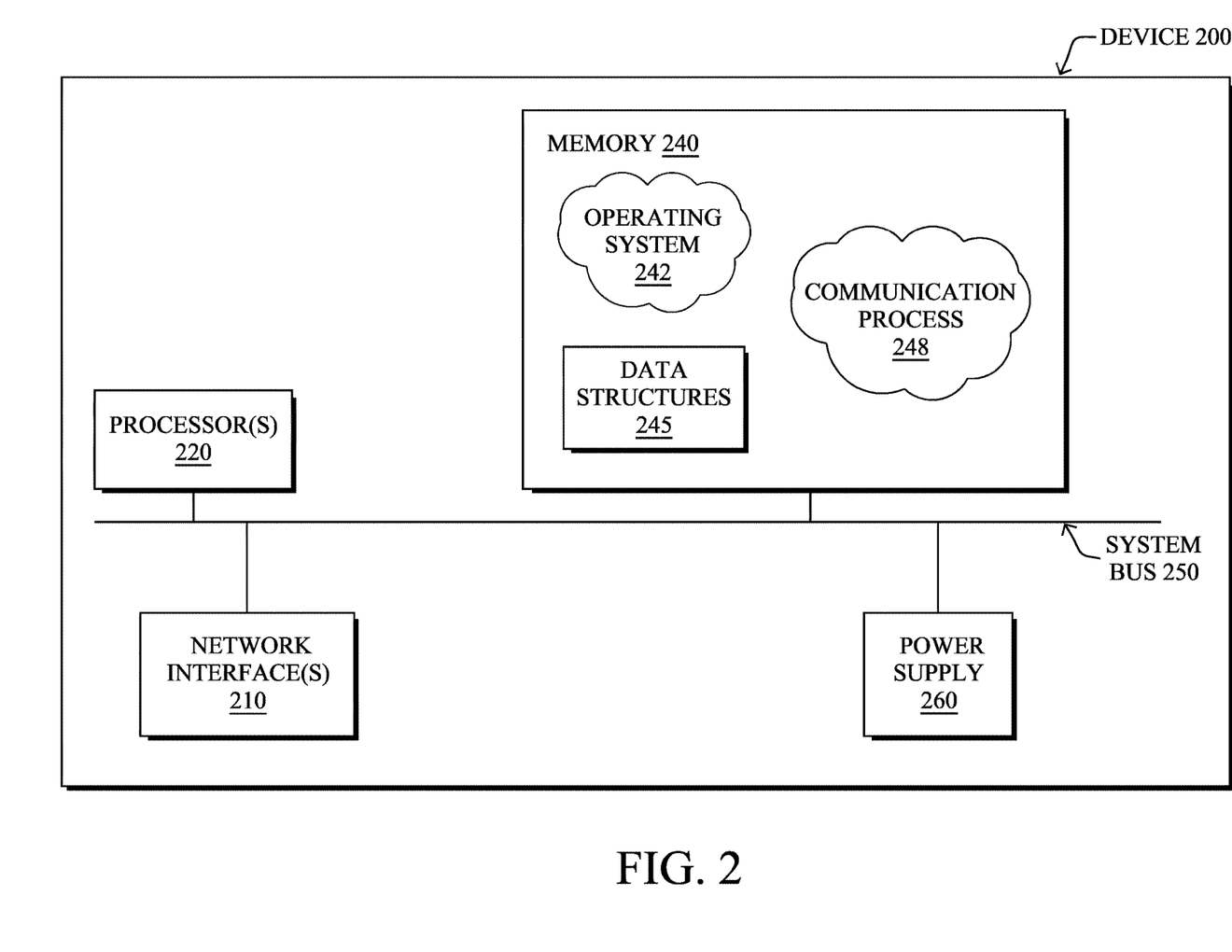
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below (e.g., a client endpoint, etc.). The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a communication process 248, as described herein, any of which may alternatively be located within individual network interfaces, the execution of which may cause device 200 to perform any or all of the functions described herein.

In general, communication process 248 may be configured to communicate via a computer network using any number of protocols such as, but not limited to, a link layer protocol (e.g., Ethernet, Frame Relay, etc.), a communication protocol (e.g., IPv4, IPv6, etc.), a transport layer protocol (TCP, UDP, etc.), an application layer protocol such as the Real-time Transport Protocol (RTP), HyperText Transfer Protocol (HTTP), HTTP-secure (HTTPS), Transport Layer Security (TLS) or Secure Socket Layer (SSL) for security, a signaling protocol such as the Session Initiation Protocol (SIP), which is typically used to initiate and control real-time sessions used for media, and the like. In various embodiments, communication process 248 may also be configured to communicate using the Traversal Using Relays around Network Address Translators (TURN), in accordance with the teachings herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
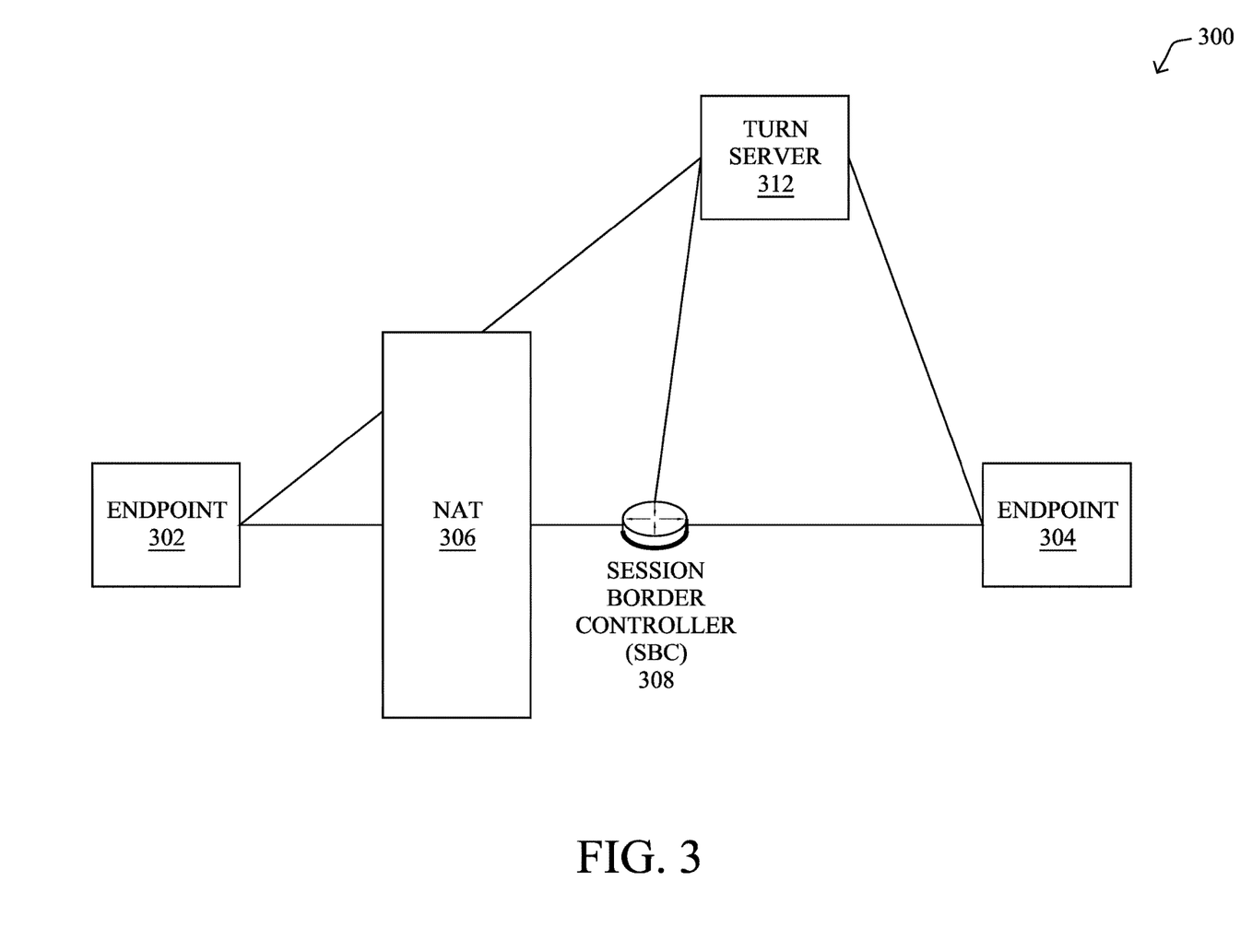
FIG. 3 illustrates an example network architecture with a Traversal Using Relays around NAT (TURN) server.

As noted above, TURN is widely deployed for NAT traversal from an enterprise to the public Internet. FIG. 3 illustrates an example network architecture 300 with a TURN server, according to various embodiments. It is to be noted that network architecture 300 is shown for purposes of illustrating the techniques herein and that the techniques herein are not limited as such and can be utilized in any number of different network architectures.

As shown, network architecture may include endpoint 302 and endpoint 304 that are to communicate with one another. For instance, endpoint 302 and endpoint 304 may comprise telephones (e.g., IP phones, etc.), mobile devices, videoconferencing equipment, or other computing devices capable of communicating via a network. For purposes of illustration, let endpoint 304 be located external to the network of endpoint 302 and let endpoint 302 and endpoint 304 both have access to the public Internet, allowing endpoint 302 and endpoint 304 to communicate with one another.

Assume now that endpoint 302 is behind a NAT 306. During operation, NAT 306 may map the IP address and/or port of endpoint 302 from a first address space to another. For instance, assume that endpoint 302 is part of a LAN of an enterprise behind NAT 306. In such a case, the IP address and/or port of endpoint 302 within the LAN may be different than its IP address and/or port, externally. Thus, when endpoint 302 sends packets/traffic externally, such as to endpoint 304 via the Internet, NAT 306 may replace the internal IP address and/or port of endpoint 302 in the header with the traffic with the mapped address and/or port.

For instance, assume that endpoint 302 sends a packet destined for endpoint 304 using an internal IP address of 10.0.1.1 and internal port 6554. When NAT 306 receives such a packet, it may search its binding table for an associated external address/port pair, such as external address 1.2.3.4 and port 8877. In turn, NAT 306 may replace the address and port in the header of the packet sent by endpoint 302 with 1.2.3.4 and port 8877.

In the case in which endpoint 302 is to initiate a media session with endpoint 304, the address translation by NAT 306 becomes problematic. For instance, if endpoint 302 sends an INVITE message via SIP to endpoint 304 to initiate an RTP session, the sent message will include the internal IP address of endpoint 302. As a result, endpoint 304 will be unable to start the RTP session, as this address is only of use within the internal network of endpoint 302.

In some instances, network architecture 300 may include SBC 308 at the edge of the local network in which endpoint 302 is located and along the communication path between endpoint 302 and endpoint 304. First, endpoint 302 must register with SBC 308 with its information. Then, among other functions (e.g., security, QoS, etc.), as would be appreciated by one skilled in the art, SBC 308 may modify the information sent by endpoint 302 as part of an SIP INVITE, such as the Call-ID, CSeq, or, most importantly, the internal IP address specified by endpoint 302. This effectively allows endpoint 302 to use SIP in conjunction with NAT 306.

While SBC 308 can help to alleviate some of the issues caused by NAT 306, certain scenarios such as symmetric operations by NAT 306 could still present problems. For instance, NAT 306 may assign a different IP address or port to each connection of endpoint 302 to different destinations. The situation becomes even more complicated when endpoint 304 is also behind its own NAT. These and other scenarios make solutions such as Session Traversal Utilities for NAT (STUN) unusable in all cases.

As shown, network architecture 300 may also include TURN server 312, which functions as a media relay between endpoint 302 and endpoint 304. In general, the TURN protocol was proposed as a more robust alternative to using STUN, but does require additional bandwidth consumption than that of STUN. For this reason, TURN is typically viewed as a fallback approach to dealing with NAT operations when STUN will not work.

To illustrate the use of TURN server 312, assume that endpoint 302 is to establish a media session with endpoint 304. In such a case, endpoint 302 may first communicate with TURN server 312, to request an allocation of its resources and an address associated with TURN server 312. Next, endpoint 302 may establish permissions with TURN server 312 that can be used to verify communications with it (e.g., communications sent from endpoint 304 to TURN server 312). In turn, endpoint 302 may then indicate the address allocated by TURN server 312 to endpoint 312, such as via SIP. This allows endpoint 304 to direct its media traffic (e.g., RTP traffic) towards TURN server 312, which then relays the media traffic back to endpoint 302. In other words, TURN server 312 may act as a relay for the media traffic between endpoint 302 and endpoint 304, since both can still communicate with the IP address allocated by TURN server 312.

Typically, authentication in TURN is achieved using a set of static credentials that are learned during onboarding. This means that all devices globally use the same set of credentials, which creates the risk of the shared credential leaking. In addition, this also relies on a digest which means two round trips are needed for each allocate operation. While it may be possible to use individual credentials per device (e.g., endpoints 302-304), such as their SIP credentials, this requires TURN server 312 to be integrated with the backend authentication service so that it can also lookup the supplied username.

TURN Authentication Using SIP Channel Discovery

The techniques herein introduce a TURN authentication approach using SIP channel discovery that avoids the drawbacks of traditional TURN authentication, such as shared credentials. In some aspects, information shared via the secure SIP channel can be used as a shared secret that only the SIP client and the server know. This shared secret can be used to generate credentials for the endpoint with a TURN server, allowing the TURN server to authorize the endpoint during an allocate request.

Specifically, according to one or more embodiments of the disclosure as described in detail below, an endpoint in a network sends a Session Initiation Protocol (SIP) registration request to a device. The device generates a first key using information included in the SIP registration request. The device also writes the first key to a storage location accessible by a Traversal Using Relays around Network address translators (TURN) server. The endpoint generates a second key based on the information included in the SIP registration request. The endpoint sends an allocate request to the TURN server that includes the second key. The TURN server authenticates the endpoint based in part by comparing the second key to the first key. The endpoint receives an allocate response from the TURN server, after the TURN server authenticates the endpoint.

Illustratively, the techniques described herein may be performed by hardware, software, and/or firmware, such as in accordance with communication process 248, which may include computer executable instructions executed by the processor 220 (or independent processor of interfaces 210) to perform functions relating to the techniques described herein.

Figure 4:
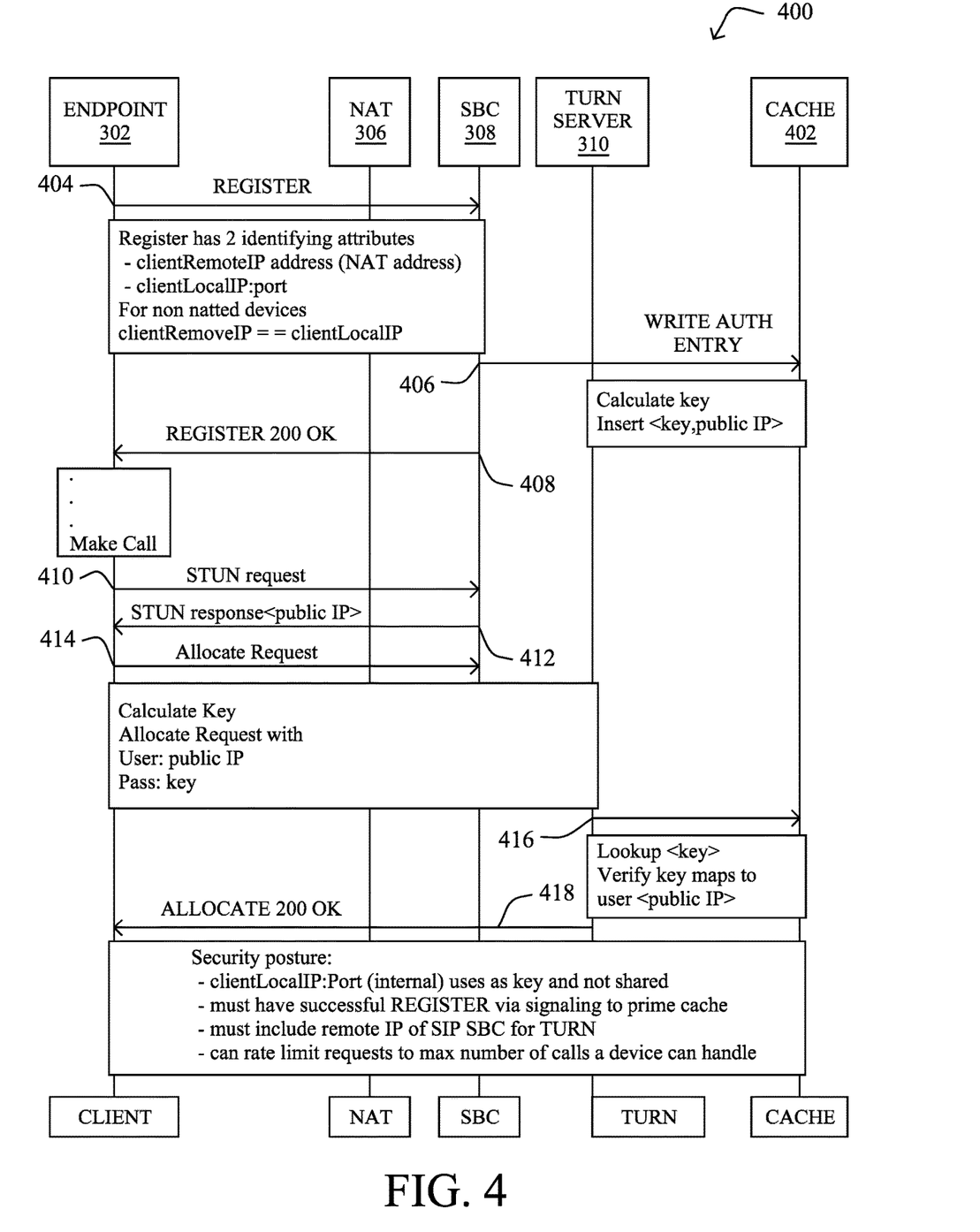
FIG. 4 illustrates an example process flow for TURN authentication using Session Initiation Protocol (SIP) channel discovery.

Operationally, FIG. 4 illustrates an example process flow 400 for TURN authentication using Session Initiation Protocol (SIP) channel discovery, according to various embodiments. Continuing the example of FIG. 3, assume that endpoint 302 is located behind NAT 306. In addition, assume that the network implementation also includes SBC 308 and TURN server 310, which includes a cache 402.

As shown, endpoint 302 may send a REGISTER request 404 to SBC 308, to register itself with SBC 308 over a secure SIP channel. In some embodiments, endpoint 302 will include the following information in the contact entry of request 404:

The local IP address and port of endpoint 302 (clientLocalIP:port)

The external IP address of endpoint 302 (clientRemoteIP) that it may learn from NAT 306, such as via a STUN bind request.

In cases in which endpoint 302 is not behind NAT 306, endpoint 302 may simply indicate that its external IP address is the same as its local IP address (e.g., that clientRemoteIP==clientLocalIP). In further embodiments, endpoint 302 may include other information associated with endpoint 302 in request 404 that it sends to SBC 308, in addition to that of its local and external IP addresses.

According to various embodiments, SBC 308 may treat the information included in request 404 as a shared secret between endpoint 302 and SBC 308, to compute a cryptographic key associated with endpoint 302. Since the SIP channel between endpoint 302 and SBC 308 is secure, this ensures that the information provided by endpoint 302 to SBC 308 is also secure. For instance, in one embodiment, SBC 308 may compute the key as follows:

key=HMAC(clientRemoteIP,clientLocalIP:port)

where HMAC is a hash-based message authentication code (HMAC) function that applies a cryptographic hash to the input parameters clientRemoteIP, clientLocalIP:port, to produce a cryptographic key. In other words, SBC 308 may use clientRemoteIP, clientLocalIP:port from request 404 as a secret to produce a key derived from the secret. Any number of different hash functions may be used for purposes of generating the new key such as, but not limited to, Secure Hash Algorithm (SHA)-2, SHA-3, or other suitable secure hash algorithm.

In further embodiments, the secret used by SBC 308 to compute the cryptographic key may be based on other information shared by endpoint 302 as part of request 404. For instance, other shared information on which the key may be computed can include a registration ID, a local session ID, or other identifier associated with endpoint 302, in further embodiments. In other words, any information that could constitute a shared secret between endpoint 302 and SBC 308 may be passed via request 404 and used by SBC 308 to generate a key.

Once SBC 308 has generated a key from the shared secret information included in request 404, SBC 308 may perform a write action 406 to cache 402 of TURN server 310, to add an authorization entry to cache 402 for endpoint 302, in some embodiments. This entry may include, for instance, the key calculated by SBC 308 using the shared secret information in request 404 and a user identifier for endpoint 302, such as the public IP address of SBC 308 or another identifier.

In turn, SBC 308 may return a REGISTER 200 OK response 408 to the SIP client of endpoint 302 via the SIP channel between endpoint 302 and SBC 308. This allows endpoint 302 to know that it has been registered with SBC 308 and can now initiate a call.

In further embodiments, SBC 308 itself may not be a SIP registrar. In other words, in further instances, SBC 308 may not be responsible for the SIP registration of endpoint 302 or generate REGISTER 200 OK response 408. Instead, the actual registrar may be a call control entity or other device inside the service network. In such cases, SBC 308 then functions as a relay between endpoint 302 and the actual call control registrar. In one embodiment, SBC 308 may then wait until the actual registrar generates and sends a REGISTER 200 OK response back towards endpoint 302, before generating the first key and/or perform write operation 406 to cache 402. In another embodiment, SBC 308 may still perform write operation 406 to cache 402 on receipt of REGISTER request 404, but then delete the entry in cache 402 if the actual register indicates that the registration was unsuccessful.

To initiate a call via TURN server 310 with another endpoint, such as endpoint 304 described previously, endpoint 302 may send a STUN request 410 to TURN server 410. In response, TURN server 310 may return a STUN response 412 to the public/external IP address of endpoint 302, which is passed on to endpoint 302 via NAT 306.

According to various embodiments, endpoint 302 may use the shared secret information that it previously included in REGISTER request 404 sent to SBC 308, to compute a cryptographic key. Thus, by applying the same hashing or other key generation algorithm to the shared secret, the key computed by endpoint 302 will match that of the key computed by SBC 308 and entered into cache 402 of TURN server 310. In turn, endpoint 302 may send an Allocate request 414 to TURN server 310 with credentials that identify endpoint 302 by its user ID (e.g., its public IP address or other identifier) and uses the key computed by endpoint 302 as the corresponding password, in various embodiments.

To verify the credentials of endpoint 302, TURN server 310 may then perform a lookup 416 of the credentials supplied by Allocate request 414 in its cache 402. More specifically, TURN server 310 may verify that the password/ key supplied by endpoint 302 matches the key previously entered by SBC 308 for endpoint 302 via write action 406. If the two do not match, TURN server 310 may conclude that the requestor of the allocation is not endpoint 302 and initiate a corrective measure, such as by denying or dropping the request.

In the case in which the credentials supplied by endpoint 302 match those entered into cache 402 by TURN server 310, TURN server 310 may issue an Allocate 200 OK response 418 back to endpoint 302. Once endpoint 302 receives response 418, the call may proceed according to normal call processing in TURN.

From a security posture standpoint, the techniques herein ensure that the keys generated by endpoint 302 and SBC 308 are protected, since they are based on a shared secret that is only known between the two, such the local IP address and port of endpoint 302 (clientLocalIP:port). In addition, there must be a successful SIP registration between endpoint 302 and SBC 308, in order to populate cache 402 with sufficient credentials for endpoint 302. Note that this also means that client 302 does not need to store its credentials for TURN server 310, as it can compute these credentials using information that it already has. In various embodiments, the TURN credentials created for endpoint 302 and stored in cache 402 via its SIP registration with SBC 308 may also remain valid only for the lifetime of the SIP registration of endpoint 302 with SBC 308. In further embodiments, security can be further enhanced by applying an access control or rate limiting policy to requests on a per-source IP address basis, so as to limit the maximum number of calls that a device or pool of devices behind a NAT can initiate.

Figure 5:
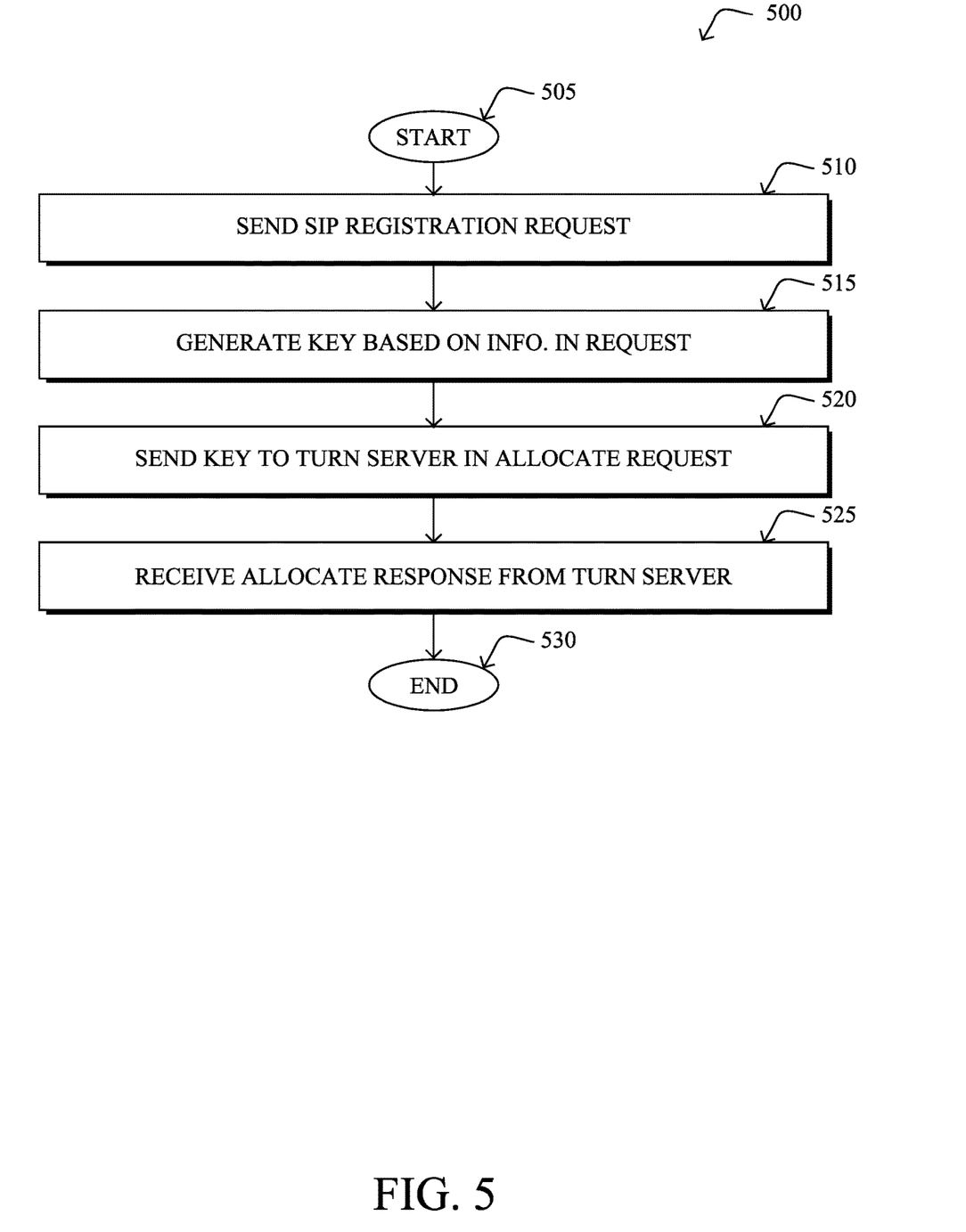
FIG. 5 illustrates example simplified procedure for TURN authentication using SIP channel discovery.

FIG. 5 illustrates an example simplified procedure for TURN authentication using SIP channel discovery, in accordance with one or more embodiments described herein. The procedure 500 may start at step 505, and continues to step 510, where, as described in greater detail above, an endpoint in a network may send a SIP registration request to a device, such as a session border controller (SBC) or other device. In turn, the device may generate a first key using information included in the SIP registration request and writes the first key to a storage location accessible by a TURN server (e.g., a cache or other storage location). In some instances, the endpoint may be located behind a NAT, hence its reliance on the TURN server. According to various embodiments, the information included in the SIP registration request may comprise a local network address and port of the endpoint, a registration identifier, a local session identifier, or other information that may be used as a shared secret between the endpoint and the device.

At step 515, as detailed above, the endpoint may generate a second key based on the information included the SIP registration request. As would be appreciated, since the SIP channel is secure between the device and the endpoint, the shared secret information remains secure between the two. In various embodiments, the endpoint may generate the second key by applying a hash to the information, such as SHA-2, SHA-3, or the like. So long as the endpoint and the device use the same hashing algorithm, the first and second keys will match.

At step 520, the endpoint may send an allocate request to the TURN server that includes the second key, as described in greater detail above. In some embodiments, the endpoint may do so as part of its credentials to the TURN server, such as its password. In response, the TURN server may authenticate the endpoint based in part by comparing the second key to the stored first key.

At step 525, as detailed above, the endpoint may receive an allocate response from the TURN server, after the TURN server authenticates the endpoint. After receipt of the response, the endpoint may begin using the TURN server for a call or other media session with another endpoint. Procedure 500 then ends at step 530.

Figure 6:
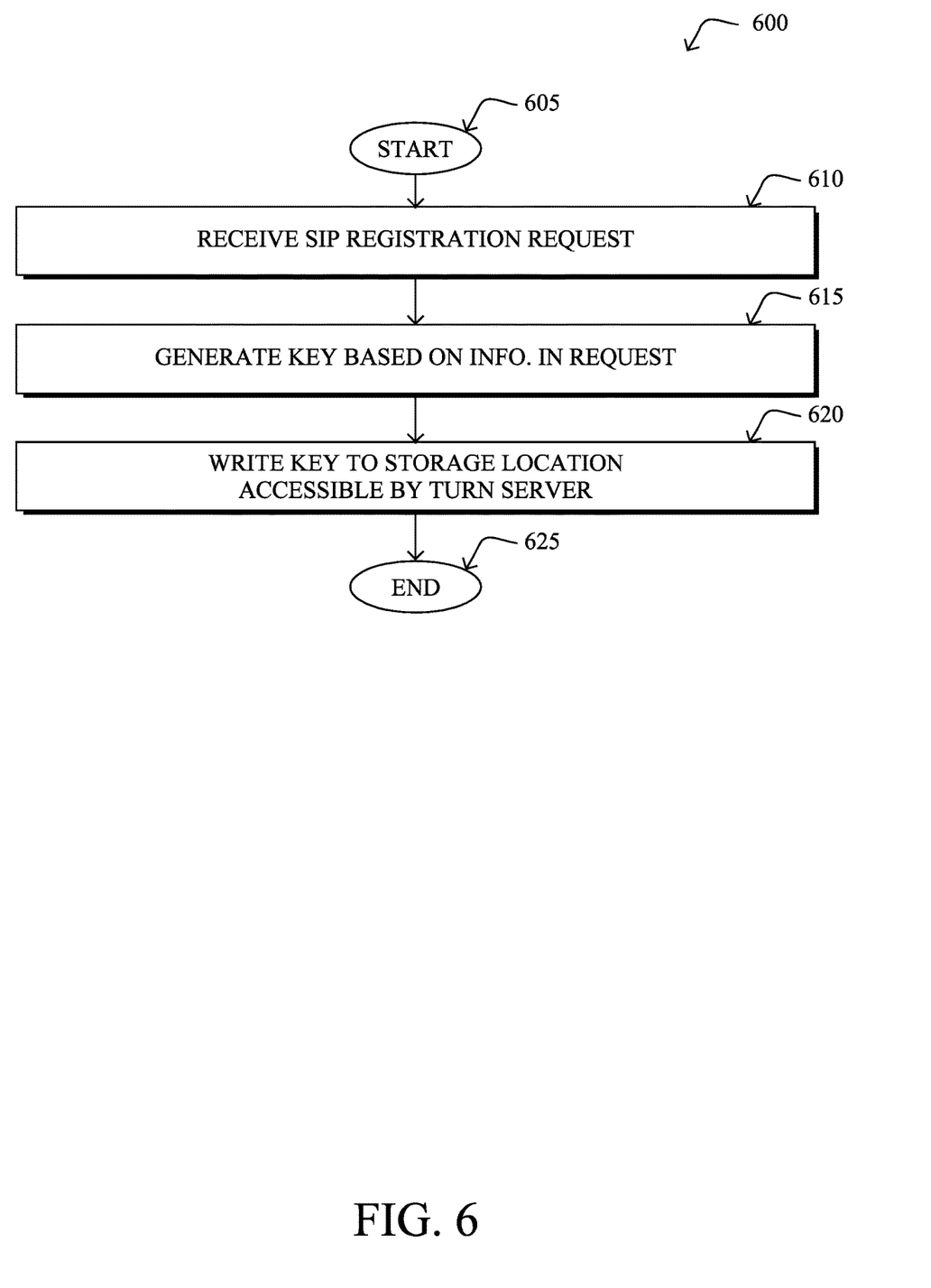
FIG. 6 illustrates another example simplified procedure for TURN authentication using SIP channel discovery.

FIG. 6 illustrates an example simplified procedure for TURN authentication using SIP channel discovery, in accordance with one or more embodiments described herein. The procedure 600 may start at step 605, and continues to step 610, where, as described in greater detail above, a device may receive a SIP registration request from an endpoint in a network. In various embodiments, the device may comprise a session border controller. In further embodiments, the SIP registration request may comprise a local network address and port of the endpoint, a registration identifier, a local session identifier, or other information that may be used as a shared secret between the endpoint and the device.

At step 615, as detailed above, the device may generate a first key using the information included in the SIP registration request. For instance, the device may apply a hashing algorithm to the information included in the SIP registration request. In other words, the information included in the SIP registration request may server as a shared secret between the device and the endpoint.

At step 620, the device may write the first key to a storage location accessible by a TURN server for use as credential information for the endpoint with the TURN server, as described in greater detail above. In various embodiments, the endpoint may generate a second key also using the information in the SIP registration request and send an allocate request to the TURN server that includes the second key. In response, the TURN server may authenticate the endpoint based in part by comparing the second key to the written first key. Procedure 600 then ends at step 625.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedure 500-600 are described separately, certain steps from each procedure may be incorporated into each other procedure, and the procedures are not meant to be mutually exclusive.

The techniques described herein, therefore, provide an enhanced TURN authentication scheme that uses lower resource allocation than traditional approaches. In addition, the authentication scheme introduced herein avoids the digest/challenge flow of traditional approaches, as well.

While there have been shown and described illustrative embodiments that provide for TURN authentication, it is to be understood that various other adaptations and modifications may be made within the spirit and scope of the embodiments herein. For instance, while the techniques herein are described primarily with respect to certain devices performing the techniques herein, the techniques herein are not limited as such. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
sending, by an endpoint in a network, a Session Initiation Protocol (SIP) registration request to a device, wherein the device generates a first key using information included in the SIP registration request, and wherein the device writes the first key to a storage location accessible by a Traversal Using Relays around Network address translators (TURN) server;
generating, by the endpoint, a second key based on the information included in the SIP registration request;
sending, by the endpoint, an allocate request to the TURN server that includes the second key, wherein the TURN server authenticates the endpoint based in part by comparing the second key to the first key; and
receiving, at the endpoint, an allocate response from the TURN server, after the TURN server authenticates the endpoint.

2. The method as in claim 1, wherein the device comprises a session border controller.

3. The method as in claim 1, wherein generating the second key based on the information included in the SIP registration request comprises:
applying a hash to the information included in the SIP registration request.

4. The method as in claim 1, wherein the endpoint is located behind a network address translator (NAT) in the network.

5. The method as in claim 1, wherein the information included in the SIP registration request comprises a local network address and port of the endpoint.

6. The method as in claim 1, wherein the information included in the SIP registration request comprises a registration identifier.

7. The method as in claim 1, wherein the information included in the SIP registration request comprises a local session identifier.

8. The method as in claim 1, wherein the second key is used as a password in the allocate request.

9. A method comprising:
receiving, at a device, a Session Initiation Protocol (SIP) registration request from an endpoint in a network;
generating, by the device, a first key using information included in the SIP registration request; and
writing, by the device, the first key to a storage location accessible by a Traversal Using Relays around Network address translators (TURN) server for use as credential information for the endpoint with the TURN server,
wherein the endpoint generates a second key using the information included in the SIP registration request,
wherein the endpoint sends an allocate request to the TURN server that includes the second key, and
wherein the endpoint receives an allocate response from the TURN server after the TURN server authenticates the endpoint based in part by comparing the second key to the first key.

10. The method as in claim 9, wherein the device comprises a session border controller.

11. The method as in claim 9, wherein generating the first key based on the information included in the SIP registration request comprises:
applying a hash to the information included in the SIP registration request.

12. The method as in claim 9, wherein the information included in the SIP registration request comprises a local network address and port of the endpoint.

13. The method as in claim 9, wherein the information included in the SIP registration request comprises a registration identifier or local session identifier.

14. An apparatus, comprising:
one or more network interfaces;
a processor coupled to the one or more network interfaces; and
a memory configured to store a process that is executable by the processor, the process when executed configured to:
send a Session Initiation Protocol (SIP) registration request to a device, wherein the device generates a first key using information included in the SIP registration request, and wherein the device writes the first key to a storage location accessible by a Traversal Using Relays around Network address translators (TURN) server;
generate a second key based on the information included in the SIP registration request;
send an allocate request to the TURN server that includes the second key, wherein the TURN server authenticates the apparatus based in part by comparing the second key to the first key; and
receive an allocate response from the TURN server, after the TURN server authenticates the apparatus.

15. The apparatus as in claim 14, wherein the apparatus device comprises a session border controller.

16. The apparatus as in claim 14, wherein the apparatus is located behind a network address translator (NAT) in the network.

17. The apparatus as in claim 14, wherein the information included in the SIP registration request comprises a local network address and port of the apparatus.

18. The apparatus as in claim 14, wherein the information included in the SIP registration request comprises a registration identifier or local session identifier.

19. The apparatus as in claim 14, wherein the second key is used as a password in the allocate request.

\* \* \* \* \*

UNITED STATES PATENT AND TRADEMARK OFFICE
CERTIFICATE OF CORRECTION

PATENT NO. : 11,533,179 B2
APPLICATION NO. : 16/992349
DATED : December 20, 2022
INVENTOR(S) : Ollie Fagan et al.

Page 1 of 1

It is certified that error appears in the above-identified patent and that said Letters Patent is hereby corrected as shown below:

In the Claims

Column 14, Line 9, please amend as shown:
15. The apparatus as in claim 14, wherein the Signed and Sealed this
Twenty-eighth Day of March, 2023

Katherine Kelly Vidal
*Director of the United States Patent and Trademark Office*